United States Patent [19]

You

[11] Patent Number: 5,067,240
[45] Date of Patent: Nov. 26, 1991

[54] CUTTER FOR CABLE, PLASTIC PIPE OR THE LIKE

[76] Inventor: Yen-Jen You, 8F-1, No. 998 Min-Sheng E Rd., Taipei, Taiwan, R.O.C.

[21] Appl. No.: 707,568
[22] Filed: May 30, 1991
[51] Int. Cl.⁵ ............................................. B26B 13/00
[52] U.S. Cl. ..................................... 30/2.49; 30/92; 30/247; 83/580; 83/603
[58] Field of Search .................. 30/92, 90.3, 215, 216, 30/245, 247, 249; 83/580, 600, 603, 651.1, 950

[56] References Cited

U.S. PATENT DOCUMENTS

| | | | |
|---|---|---|---|
| 248,996 | 11/1881 | Burdick | 83/580 |
| 1,469,467 | 10/1923 | Wagenbach | 83/603 X |
| 4,467,683 | 8/1984 | Newkirk | 83/600 X |
| 4,644,650 | 2/1987 | Laux et al. | 30/92 |

Primary Examiner—Douglas D. Watts
Attorney, Agent, or Firm—Bacon & Thomas

[57] ABSTRACT

A convenient and effective cutter for a cable, a plastic pipe or the like is provided. The cutter includes a base rotatably receiving therein a screw rod having a screw portion and a driving end, an immovable blade having a first curved portion having a first curved knife-edge, and a movable blade having a second curved portion having a second inner curved knife-edge and an outer toothed surface capable of engaging with the screw portion. When the driving end is rotated, the two knife-edges can be set in a relative motion to cut a work piece contained between the curved portions.

4 Claims, 7 Drawing Sheets

CUTTER FOR CABLE, PLASTIC PIPE OR THE LIKE

BACKGROUND OF THE INVENTION

The present invention relates to a cutter, and more particularly to one used for a cable, a plastic pipe or the like.

To have a desired length, a cable, e.g. a Cu-Al-cable or a plastic pipe, e.g. a PVC pipe needs to be cut by a cutter which has a larger cutting ability and has the knife-edges thereof made of a harder material and heat-treated since it needs to cut through a relatively hard encapsulating layer or pipe wall (and the metal core wires). Cutters for such use obtainable presently in the market invariably assume the form of a pair of scissors having two scissoring blades intermediately pivotally connected together to cut a work piece contained therebetween when handle portions of the blades are force-applied. Since the work piece is freely contained therebetween, the work piece tends to escape from the scissoring mouth of the scissors when the blade handles are force-applied. In addition, a palm can only apply a relatively limited force to the blade handles which cannot always be easily operated to have and accurate cut.

SUMMARY OF THE INVENTION

It is therefore an object of the present invention to provide a cutter for a cable, a plastic pipe or the like, being convenient in use and/or easy in operation and/or effective in cutting.

According to the present invention, a cutter for a cable, a plastic pipe or the like includes a base rotatably receiving therein a screw rod having a screw portion and a driving end, an immovable blade having a first curved portion having a first curved knife-edge, and a movable blade having a second curved portion which cooperates with the first curved portion to contain therebetween a work piece and includes a second inner curved knife-edge and an outer toothed surface capable of engaging with the screw portion such that when the driving end is rotated, the knife-edges can be set in a relative motion to cut the work piece.

The present invention may best be understood through the following description with reference to the accompanying drawings, in which:

DETAILED DESCRIPTION OF THE PREFERRED EMBODIMENT

Figure 1:
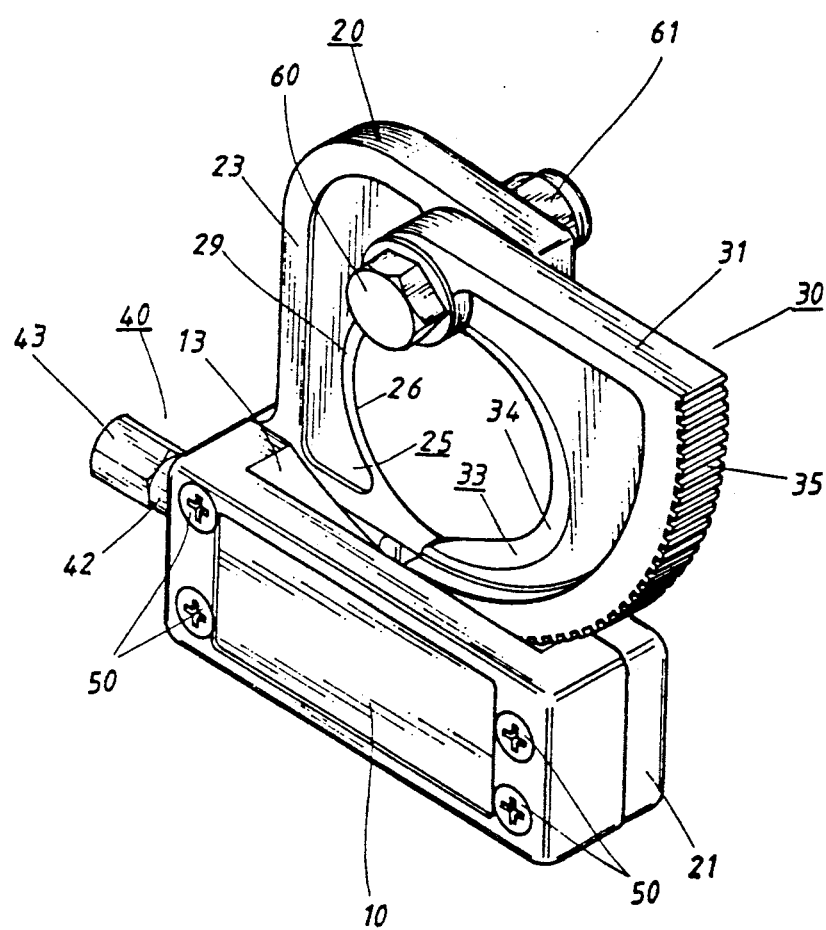
FIG. 1 is a perspective view showing a preferred embodiment of a cutter for a cable, a plastic pipe or the like according to the present invention.
Figure 2:
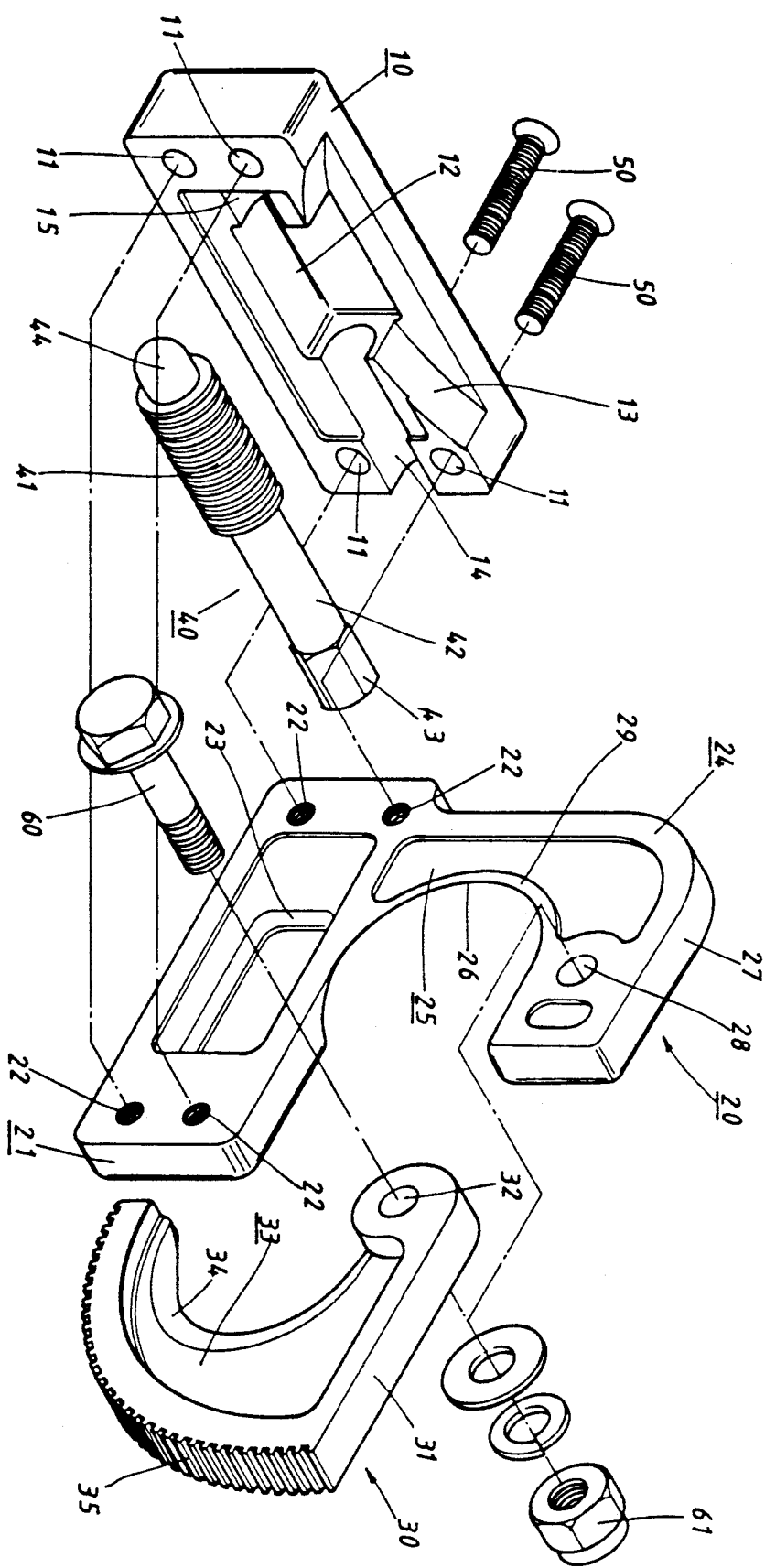
FIG. 2 is an exploded view showing a cutter in FIG. 1.
Figure 3:
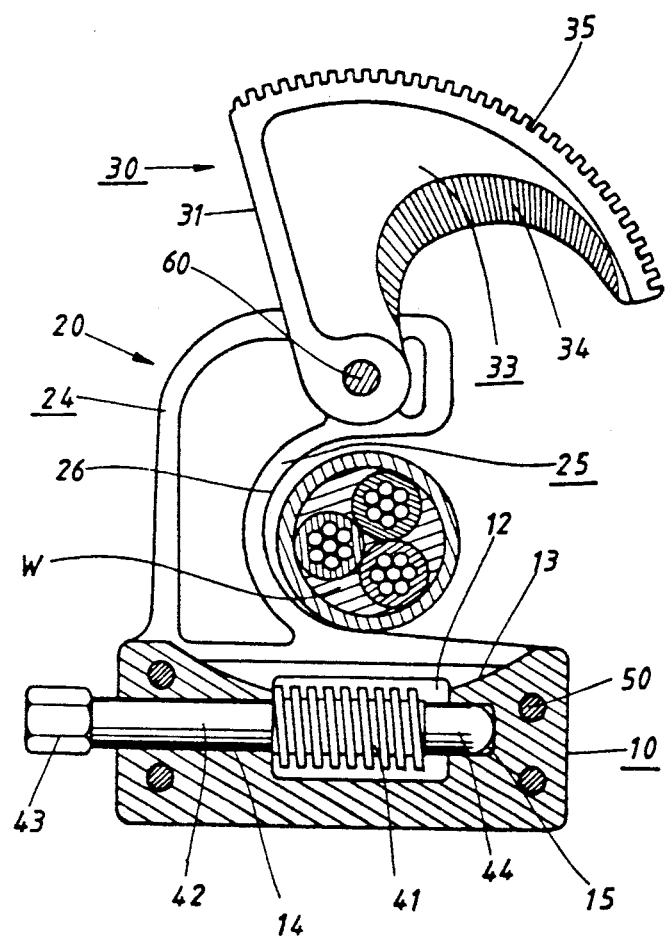
FIG. 3 is a sectional view showing a first state of a cutter in FIG. 1.
Figure 4:
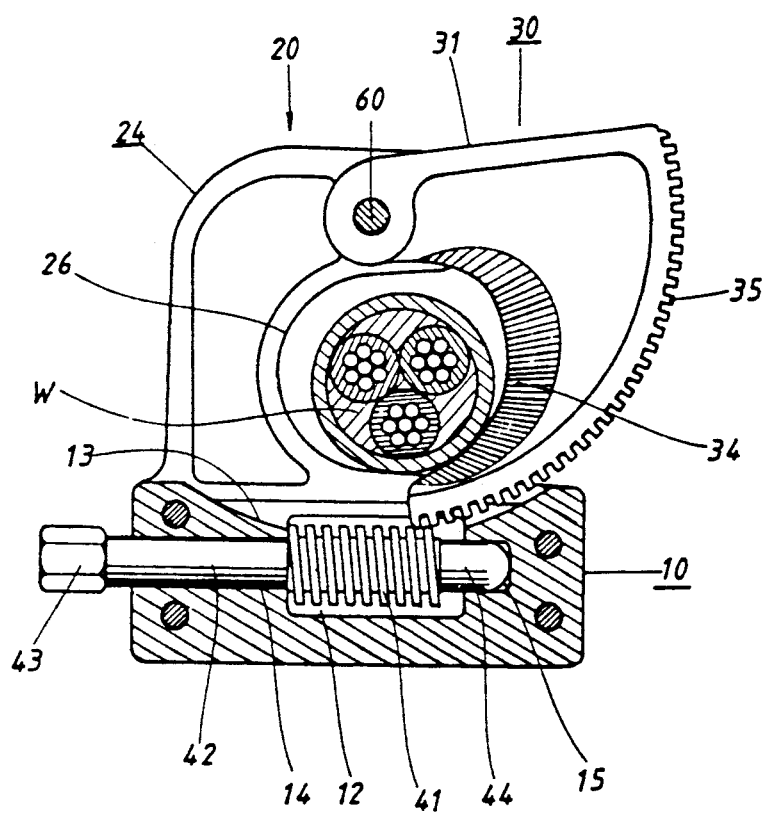
FIG. 4 is a sectional view showing a ready state of a cutter in FIG. 1.

Referring now to FIGS. 1-4, a cutter for a cable, a plastic pipe or the like according to the present invention includes a base 10, an immovable blade 20, a movable blade 30 and a screw rod 40. Base 10 being generally a parallelepiped includes 4 corner holes 11, a receiving room 12, an upper concave surface 13 communicating with receiving room 12, and an axial hole interrupted by receiving room 12 and defining an end hole portion 15 and a through hole portion 14.

Screw rod 40 includes a positioning end 44 guidedly received in end hole portion 15, an opposite driving end 43 protruding out of base 10, a rod body 42 rotatably received in through hole portion 14, and a screw portion 41 received in receiving room 12 and protruding beyond upper concave surface 13.

Immovable blade 20 includes a lower portion 21 and an upper portion 24. Lower portion 21 has 4 corner threaded holes 22 through which and corner holes 11 4 bolts 50 pass in order to fix lower portion 21 to base 10 and has a recess 23 in order to preferably match screw rod 40 between base 10 and lower portion 21. Upper portion 24 defines a curved portion 25 having a curved knife-edge 26 and has a lateral top 27 having a through hole 28.

Movable blade 30 having a straight portion 31 having a through hole 32 through which a bolt 60 passes through hole 28 into a nut 61 to pivotally fix together blades 20, 30 defines an inner corresponding curved portion 33 having a knife-edge 34, and an outer toothed surface 35 capable of engaging with screw portion 41 protruding beyond upper concave surface 13. Knife-edges 26, 34 generally have oppositely outwardly facing inclined surfaces and oppositely inwardly facing flat surfaces (29).

Figure 5:
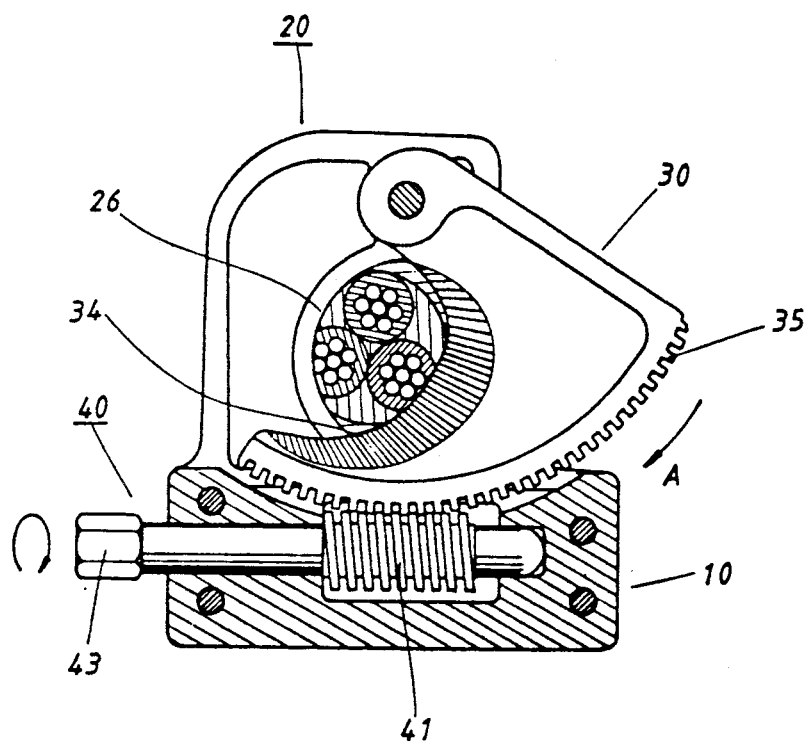
FIGS. 5 and 6 are sectional views respectively showing two cutting states of a cutter in FIG. 1.
Figure 6:
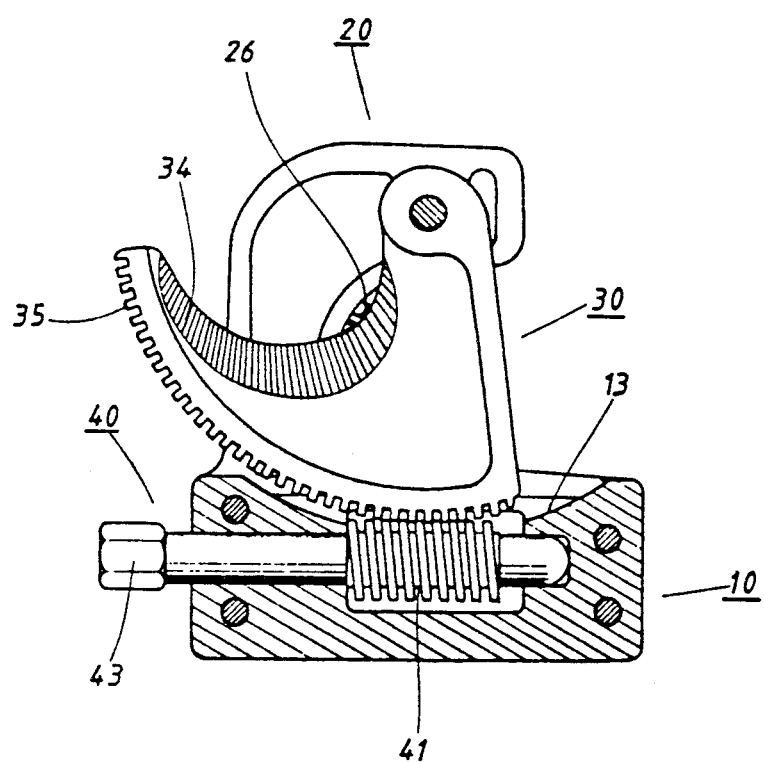
Figure 7:
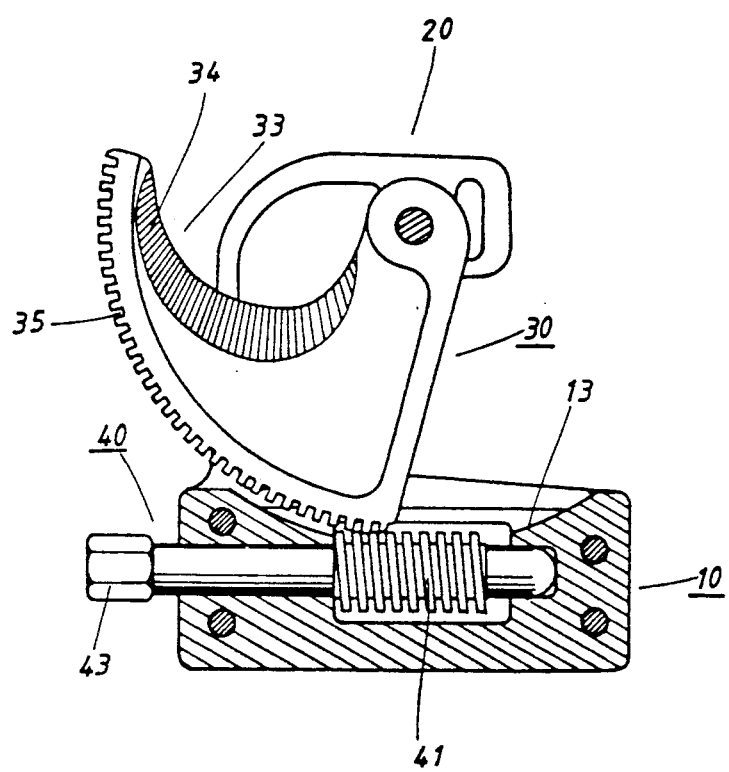
FIG. 7 is a sectional view showing a cutter in FIG. 1 having completed a cutting work.

In use, movable blade 30 is first upwardly pivoted with respect to immovable blade 20 in order to insert a work piece W into curved portion 25 and then downwardly pivoted to mesh outer toothed surface 35 with screw portion 41. As shown in FIGS. 5 and 6, If driving end 43 is rotated, intermeshing toothed surface 35 and screw portion 41 will be set in a relative motion so that movable blade 30 will pivot forward with respect to immovable blade 20 in the direction shown by arrow A and thus knife-edges 26, 34 will correspondingly continuously cut through work piece W until work piece W is fully cut through as shown in FIG. 7.

Since work piece W is contained between curved portions 33, 25, it is hardly possible that work piece W will escape from the present cutter. By using a lever or the like with driving end 43, not only the operation of the present cutter is made easier but also it can provide an even stonger cutting force.

Through the above description, it should now become readily apparent how and why the present invention can achieve the object it contemplates.

What I claim is:

1. A cutter for cable, a plastic pipe or the like comprising:

a base having an upper surface;

a screw rod rotatably received in said base, and including a screw portion protruding beyound said upper surface and a driving end protruding out of said base;

an immovable blade fixed to said base, and having a first curved portion having a first curved knife-edges; and a movable blade pivotably fixed to said immovable blade, and having a second curved portion which cooperates with said first curved portion to contain therebetween a work piece and includes a second inner curved knife-edge and an outer toothed surface capable of engaging with said screw portion in a manner that when said driving end is rotated, said first and second curved knife-edges can be set in a relative motion to cut said work piece.

2. A cutter according to claim 1 wherein said upper surface is concave for passing thereabove said toothed surface.

3. A cutter according to claim 1 wherein said immovable blade includes a lower portion attached to said base and an upper portion forming said first curved portion.

4. A cutter according to claim 1, further comprising a pivot passing through said immovable and movable blades for pivotably connecting together said blades.

* * * * *